United States Patent [19]

King et al.

[11] Patent Number: 4,614,201
[45] Date of Patent: Sep. 30, 1986

[54] BREAK-AWAY COUPLING FOR HOSELINES

[76] Inventors: Frank E. King, 5, Faraday Road, Peterlee, Co. Durham; Joseph Estebanez, Dartans, 113 Lache Lane, Chester; Reginald W. Lang, 34, Sandholme Drive, Burley-in-Wharfedale, Ilkley, W. Yorkshire, all of England

[21] Appl. No.: 571,161

[22] Filed: Jan. 16, 1984

Related U.S. Application Data

[63] Continuation of Ser. No. 273,515, Jun. 15, 1981, abandoned.

[51] Int. Cl.[4] .............................. F16K 17/14
[52] U.S. Cl. .................... 137/68.1; 137/312; 137/614.04; 285/2; 403/2
[58] Field of Search ........... 285/2, 3, 4, 13, 14; 137/68 R, 312, 614.02, 614.03, 614.04; 277/59, 70, 71, 72, 72 FM, 105, 106; 403/2; 411/1, 2, 3, 5; 220/89 A

[56] References Cited

U.S. PATENT DOCUMENTS

| 1,495,946 | 5/1924 | Bassett | 285/2 |
| 1,765,629 | 6/1930 | Stanley | 277/59 X |
| 2,322,449 | 6/1943 | Johnson | 137/614.04 |
| 3,307,574 | 3/1967 | Anderson | 137/312 |
| 3,542,047 | 11/1970 | Nelson | 137/68 R |
| 3,797,510 | 3/1974 | Torres | 137/68 R |
| 3,922,104 | 11/1975 | McCullough | 403/2 |
| 4,090,524 | 5/1978 | Allread | 137/68 R |
| 4,328,822 | 5/1982 | Wilhelm | 137/68 R |

Primary Examiner—Harold W. Weakley
Attorney, Agent, or Firm—James C. Wray

[57] ABSTRACT

A break-away coupling for incorporation in a hoseline or pipeline, comprises a pair of tubular coupling members each being arranged at its one end for connection to a length of hoseline and provided at its other end with a face to be held in sealing engagement with a complementary face of the other member by frangible connectors. Each connector has one end length of spatulate shape and formed with a through opening to receive a shear pin, a screwed length at the other end to receive a nut, and an intermediate length of reduced section. Valve members in the coupling members are held in open positions against the action of springs until the coupling members are separated on breaking of the connectors; thereupon, the valve members close under spring action. A bleed passageway may be provided to prevent build-up of pressure between the complementary faces, and provide a seal testing facility.

3 Claims, 4 Drawing Figures

BREAK-AWAY COUPLING FOR HOSELINES

This application is a continuation of application Ser. No. 273,515, filed June 15, 1981, now abandoned.

BACKGROUND OF THE INVENTION

This invention relates to a so-called break-away coupling for incorporation in a hoseline, pipeline or the like, to minimise or eliminate spillage in the event of breaking of the hoseline as in, for example, an accidental drive-away situation.

It is an object of the present invention to provide a break-away coupling which is of simple and robust construction and satisfactorily safe in operation.

SUMMARY OF THE INVENTION

According to one aspect of the present invention there is provided a break-away coupling member for incorporation in a hoseline or pipeline, the coupling member comprising a generally tubular body part arranged at its one end for connection to a length of hoseline and provided at its other end with a face to be held in sealing engagement with a complementary face of a second part, by frangible means; a valve seat in said body part; a valve member in said body part urged by spring action towards engagement with said seat; and an abutment member to engage and hold the valve member against said spring action out of engagement with its valve seat until said body and said second part are separated on breaking of said frangible means; characterised in that said frangible means comprise a plurality of frangible connectors each of which has one end length of spatulate shape and formed with a through opening to receive a shear pin, a screwed length at the other end to receive a nut, and an intermediate length of reduced section.

Said body part and said second part are, suitably, formed with lugs to receive the spatulate lengths and the screwed lengths, respectively, of the connectors, and to be engaged respectively by the shear pins and the nuts.

According to another aspect of the present invention, the break-away coupling is characterised in that inner and outer concentric sealing rings are provided between said faces, and a bleed passageway opens from the annular zone between said sealing rings to prevent build-up of pressure in said zone in the event of leakage of fluid past the inner sealing ring.

Said second part may also comprise a body part as defined above, and, preferably, the valve members are substantially identical, each valve member carrying a projecting abutment member.

DESCRIPTION OF A PREFERRED EMBODIMENT

Figure 1:
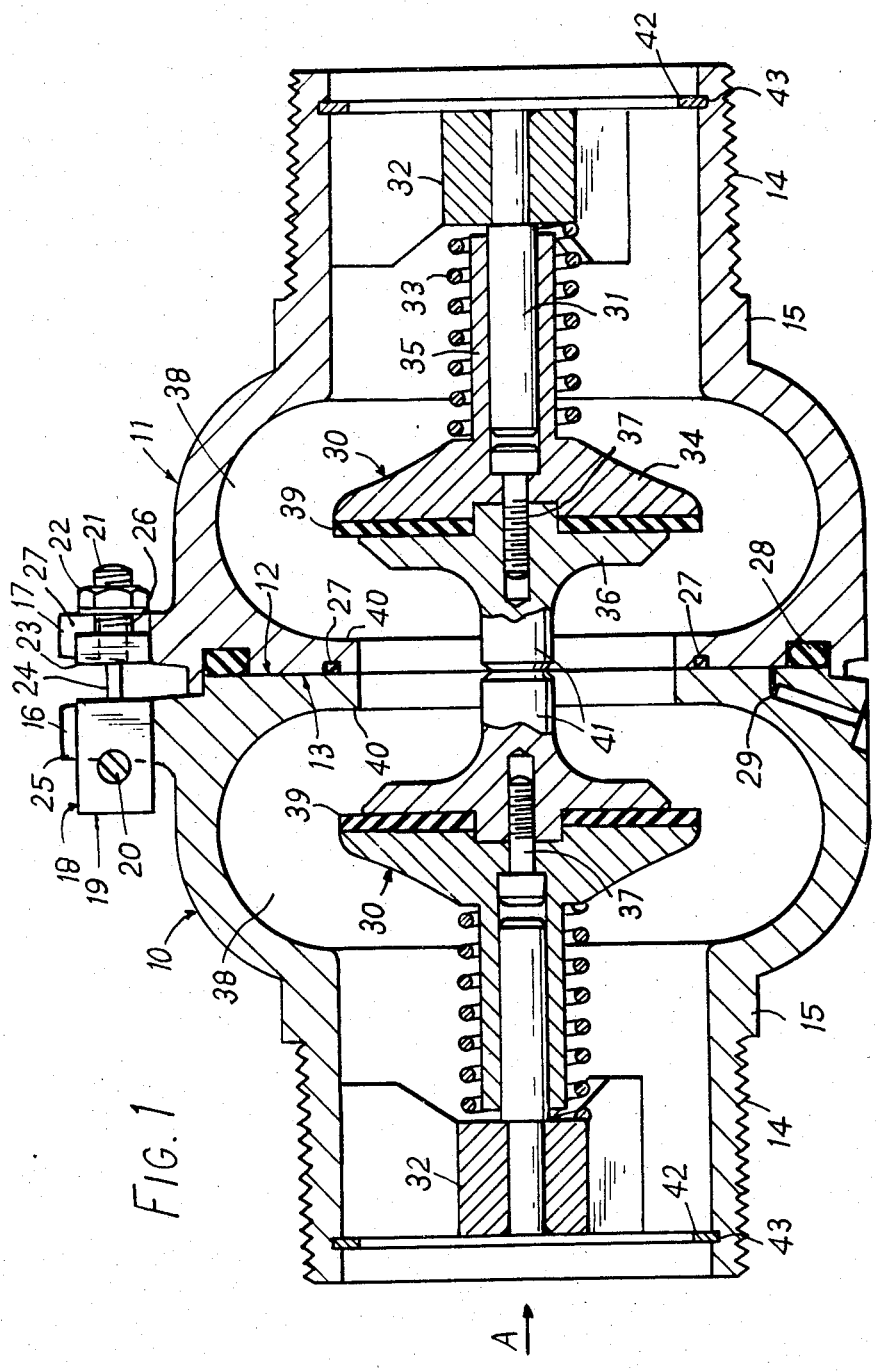
FIG. 1 is a sectional elevation showing a break-away coupling for incorporation in a hoseline.
Figure 2:
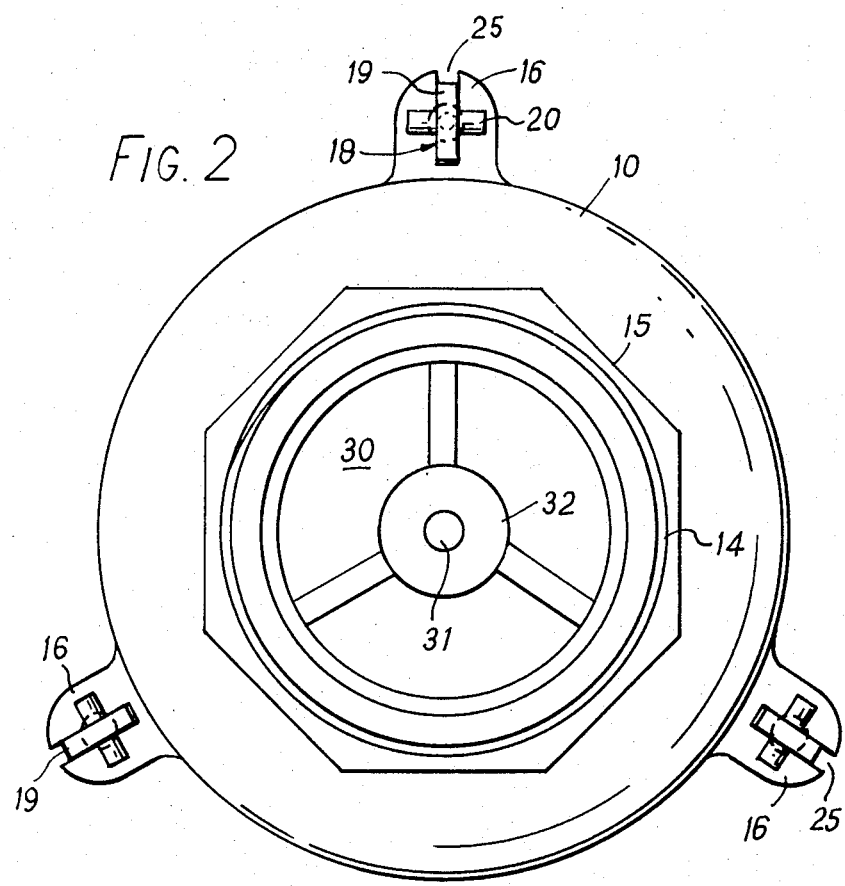
FIG. 2 is an end view in the direction of Arrow A.

Referring to the drawings, the break-away coupling for a hoseline comprises two shaped body parts 10 and 11 of generally tubular form, which are formed at their adjacent ends with cooperating sealing faces 12 and 13. At their remote ends, the parts are formed with standard screwed lengths 14 for connection to the ends of lengths of the hoseline (not shown) for the delivery of hazardous fluid such as liquified petroleum gas (LPG). As shown, each body part is formed at its other end with standard hexagon flats 15.

Figure 3:
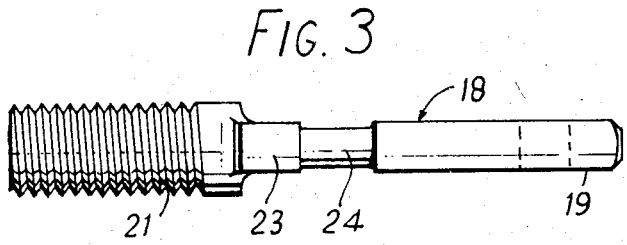
FIG. 3 is a detail view showing a frangible connector.

The parts 10 and 11 are also each formed with three lugs 16 and 17, respectively, which are coupled together by three frangible connectors 18. As shown in FIGS. 1 and 3, each connector 18 has at one end a spatulate blade 19 formed with a bore for a shear pin 20 and, at the other end, has a screwed length 21 to receive a nut 22, and a locating place 23. A frangible length 24 of reduced section extends between the blade 19 and the locating piece 23. The blades 19 enter slots 25 in the lugs 16 of the body part 10, with the pins 20 engaging the lugs, and the screwed lengths extend through axial bores 26 in the lugs 17 of the body parts 11; the locating pieces 23 are received by slots 27 in the lugs 17 and act to prevent the lengths 24 being subjected to torque when the nuts 22 are tightened.

First and second sealing O-rings 27 and 28 are accommodated in annular recesses in the face 13 of the body part 11, and a bleed passageway 29 leads to atmosphere from the face 12, between the sealing rings. The outer end of this passageway may be capped or formed as a connector.

Each body part accommodates a valve member 30 which is slidably mounted on stalk 31 of a spider 32 and is urged towards the cooperating end of the body part by a compression spring 33. The valve members 30 each comprise a valve head 34 formed with a hollow stem 35 which receives the central stalk 31 of the spider guide, and a valve cap 36 which is secured to the head by a bolt 37. As can be seen from FIG. 1, the valve heads and caps are accommodated in enlarged chambers 38.

Annular seals 39 are sandwiched one between each valve head and valve cap of the valve members, in positions to engage rim seats 40 inside the cooperating ends of the body parts 10 and 11.

A central abutment limb 41 extends integrally from each valve cap 36, and the abutting ends of the limbs may be of complementary concave and convex form to centralise the valve members.

In normal use of the break-away coupling, which is inserted at a suitable location in the hoseline, the valve body parts 10 and 11 are held in sealing engagement with one another by means of the three connectors 18. In this position, the O-rings 27 and 28 act to eliminate leakage from the interior of the coupling, but if, in service, any fluid does leak past the inner seal 27, build-up of pressure in the annular zone between the faces 12 and 13, which could over-stress the connectors 18, is prevented by provision of the bleed passageway 29. The passageway 29 is, of course, sufficiently restricted to prevent excessive loss of fluid in the event of complete failure of the seal 27. A further use of the bleed passageway is to provide for convenient testing of the state of the seal 27; regular testing is important in a coupling of this kind which, hopefully, will be employed but never operated. In the normal-use position illustrated, throughflow of fluid is permitted as the limbs 41 abut one another to hold the valve members 30 in open positions against the action of their springs 33. The large-diameter chambers 38 minimize any flow restriction which the valve heads 34 might otherwise impose. It will also be noted that the ends of the hollow valve stem 35 are arranged almost to abut the spiders 32 so that, when the valve parts are coupled together, the two valve members 30 are both opened by substantially equal amounts. The spiders 32 are retained in their correct positions by circlips 42 inserted in grooves 43 in the tubular body parts 10 and 11.

In the event of a hoseline being stretched excessively, for example in the case where a tanker drives off inadvertently or in a crisis situation with its hoseline coupled to a fixed installation, the connectors 18 will fracture before rupture of the hoseline itself. If the coupling is angled or twisted, fracture of one connector 18 is intended to permit fluid to pass the inner seal 27 and thus apply fluid pressure to the zone between the seals 27 and 28 and so fracture or assist in fracturing the other two connectors. On the fracture of the connectors 18 and consequent separation of the body parts 10 and 11, the valve members 30 will snap shut under the action of springs 33 and aided by the product pressure, so that the seals 39 engage the rim seats 40 and seal the ends of the hoseline with a minimum spillage of the fluid (such as LPG) being transferred.

The form of the connectors and the complementary form of flanges employed, prevents the incorrect use of standard and probably higher-strength bolts; also, alternative areas of breakage are provided by the reduced-section lengths 24 which will fail in tension and in the pins 20 which will fail in shear, and the blades 19 may also or alternatively be designed to fail in shear.

Figure 4:
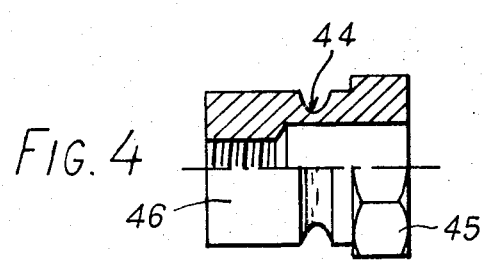
FIG. 4 is a detail view showing a shear nut.

Modification may be made without departing from the scope of the invention. For example, FIG. 4 shows a shear nut which may replace the standard nuts 22 on the connectors 18. The shear nut is formed with a reduced section 44 so that, when tightened, the nut head 45 will shear off at a predetermined torque whereby the three connectors will be loaded to a desired and uniform degree. Also, the removal of the heads 45 will minimise the risk of unauthorised or accidental dismantling of the coupling as a special tool would be required to remove the remaining (leading) lengths 46 of the shear nuts.

In another embodiment of the invention, only one of the body parts 10 or 11 is as illustrated, the other part being connected to a suitable open coupling flange; this form of coupling may be effectively one-ended, with only one of the parts being provided with a poppet valve (30).

As illustrated, the coupling is for incorporation in a hoseline, but one end part of the coupling may be connected to a fixed supply or delivery point; particularly in such a case, the screwed lengths 14 and the hexagon flats 15 may be replaced by suitable flanges. In a further application, the coupling is incorporated in a metal or other more-or-less rigid pipeline which may be subjected to line-shock or surge pressures.

We claim:

1. A break-away coupling device for use with a hoseline or pipeline, comprising a first coupling member of generally tubular form for connection at its one end to a length of hoseline or pipeline and provided at its other end with a face to be held in sealing engagement with a complementary face of a second coupling member, and frangible means holding said faces in sealing engagement, said first coupling member further comprising a valve seat and a valve member, spring means urging the valve member towards closing engagement with said seat, but the valve member usually being held against said spring means out of engagement with the valve seat until said coupling members are separated on breaking of the frangible means; said frangible means comprising a plurality of frangible connectors each of which has one end length of spatulate shape and formed with a through opening to receive a shear pin, a screwed length at the other end to receive a nut or the like, and an intermediate length of reduced section.

2. A break-away coupling device for use with a hoseline or pipeline, comprising a first coupling member of generally tubular form for connection at its one end to a length of hoseline or pipeline and provided at its other end with a face to be held in sealing engagement with a complementary face of a second coupling member, and frangible means holding said faces in sealing engagement, said first coupling member further comprising a valve seat and a valve member, spring means urging the valve member towards closing engagement with said seat, but the valve member usually being held against said spring means out of engagement with the valve seat until said coupling members are separated on breaking of the frangible means; said frangible means comprising a plurality of frangible connectors each of which has one end length of spatulate shape and formed with a through opening to receive a shear pin, a screwed length at the other end to receive a nut or the like, and an intermediate length of said reduced section in which said coupling members are each formed with lugs to receive spatulate lengths and the screwed lengths, respectively, of the connectors, and to be engaged respectively by the shear pins and the nuts or the like.

3. A break-away coupling device for use with a hoseline or pipeline, comprising: a pair of coupling members of generally tubular form; one for connection at its one end to a length of hoseline or pipeline and the other for connection at its one end to a hoseline, pipeline or other fluid-supply or fluid-delivery point, and each coupling member being provided at its other end with a complementary face to be held in sealing engagement with the complementary face of the other coupling member; one face being surrounded by a projection and the other face being surrounded by a depression which receives the projection for holding the faces aligned when juxtaposed; inner and outer sealing rings provided between the faces and defining therebetween an annular zone, a passageway leading from the annular zone and extending through a portion of one coupling member to an outside thereof; frangible means holding said faces in sealing engagement; each coupling member further comprising a valve seat and a valve member, spring means urging the valve member towards closing engagement with said seat, but the valve member usually being held against said spring means out of engagement with the valve seat until said coupling members are separated on breaking of the frangible means; and, said coupling means comprising a plurality of frangible connectors each of which has one end length of spatulate shape and formed with a through opening to receive a pin, a screwed length at the other end to receive a nut or the like, and an intermediate length of reduced section in which said coupling members are each formed with lugs to receive the spatulate lengths and the screwed lengths, respectively, of the connectors, and to be engaged respectively by the pins and the nuts or the like.

* * * * *